United States Patent [19]

Thomas

[11] 4,183,369
[45] Jan. 15, 1980

[54] METHOD OF TRANSMITTING HYDROGEN

[76] Inventor: Robert E. Thomas, 1800 S. Baltimore Ave., Tulsa, Okla. 74119

[21] Appl. No.: 848,614

[22] Filed: Nov. 4, 1977

[51] Int. Cl.² .............................................. F17D 1/02
[52] U.S. Cl. ...................................... 137/13; 206/0.7; 423/248; 55/523
[58] Field of Search ...................... 206/0.7; 55/66, 74, 55/523; 62/48; 34/15; 137/13; 123/1, 3; 23/281; 423/248; 48/61

[56] References Cited

U.S. PATENT DOCUMENTS

| | | | |
|---|---|---|---|
| 3,350,229 | 10/1967 | Justi | 206/0.7 |
| 3,406,496 | 10/1968 | Betteridge | 55/74 X |
| 3,922,872 | 12/1975 | Reilly | 55/74 X |
| 4,036,944 | 7/1977 | Blytas | 55/74 X |

FOREIGN PATENT DOCUMENTS 1232976  5/1971  United Kingdom ........................ 62/48

*Primary Examiner*—Alan Cohan
*Attorney, Agent, or Firm*—Head & Johnson

[57] ABSTRACT

A method and apparatus for transmitting hydrogen gas from one point to another wherein the hydrogen gas is first purified to remove deleterious oxygen, carbon dioxide and any other contaminate. The gas may be compressed to raise that pressure to a preselected level. The pressurized hydrogen gas is introduced into the inlet of a pipeline which is at least partially filled with activated metallic hydride wherein at least a portion of the hydrogen gas is absorbed by the metallic hydrides and is transported by migration through the metallic hydrides from the inlet towards the outlet end of the pipeline, and withdrawing the hydrogen gas from the pipeline outlet end, at least a portion of the hydrogen gas delivered at the outlet end as a consequence of desorption from the metallic hydride.

4 Claims, 1 Drawing Figure

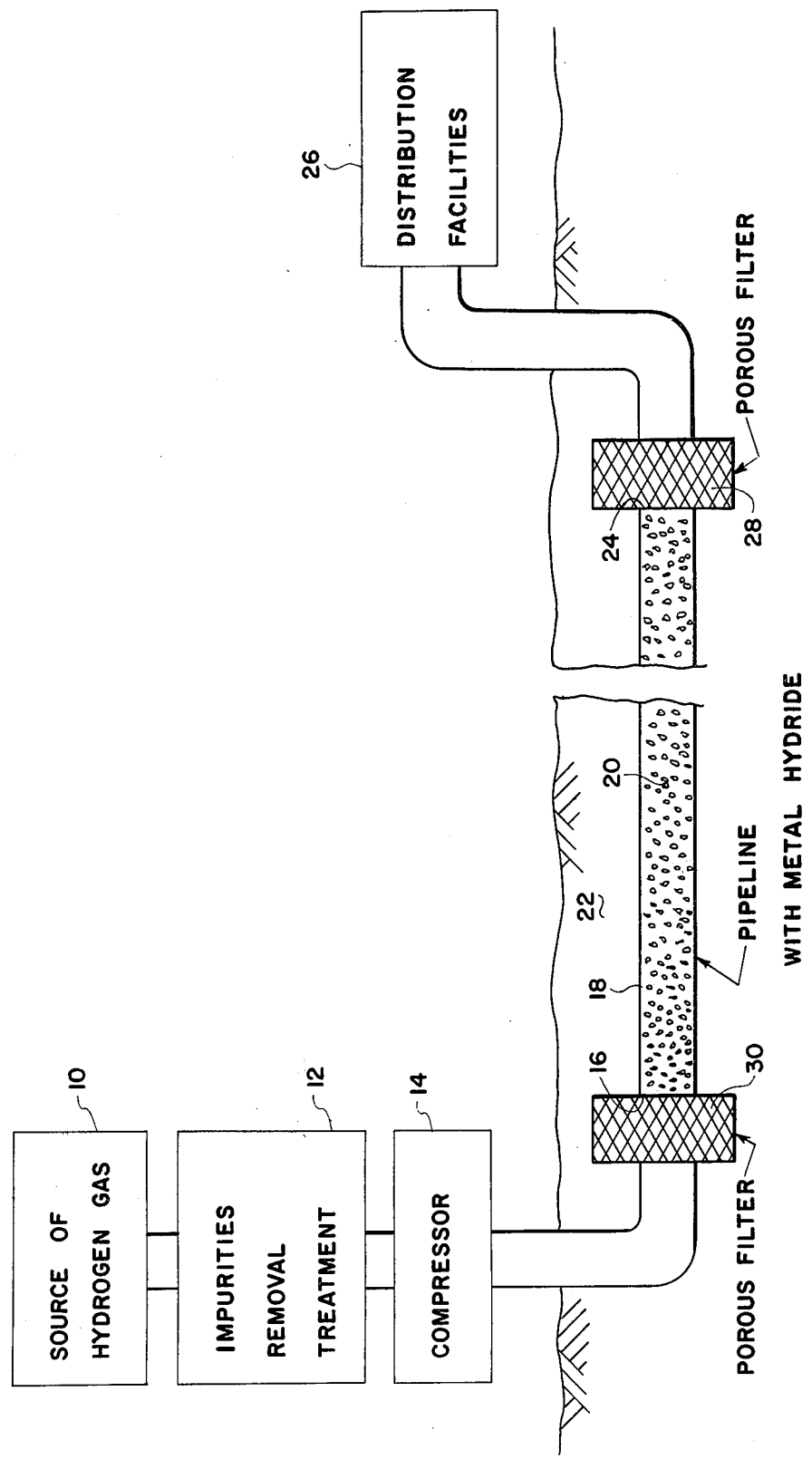

4,183,369

METHOD OF TRANSMITTING HYDROGEN

BACKGROUND OF AND OBJECTS OF THE INVENTION

A highly useful fuel is the simple element hydrogen. Hydrogen can be burned in air to produce heat without any simultaneous production of contamination, the consequence of burning being merely the formation of water. With the impending fuel shortage of the future, hydrogen will inevitably play a more important role in meeting the world's energy demands. As with any energy source one of the requirements of widespread utilization is a method of transmitting the energy. Hydrogen is a gas except at cryogenic temperatures which are necessary to maintain it in a liquid or solid state. Because of the difficulty and expense of producing and maintaining cryogenic temperatures, the most effective utlization of hydrogen will occur as a gaseous fuel. Hydrogen gas can be transported through pipelines in the same way that natural gas is transmitted. However, since hydrogen has a lower BTU value per volume than natural gas, a significantly greater volume of the hydrogen gas must be transported, requiring larger pipelines and compression stations to move a selected quantity of fuel.

Another problem with the use of hydrogen gas is that of storage. As previously stated, hydrogen has a relatively low BTU value per volume and, consequently, storing hydrogen gas in large quantities is expensive.

The present invention is directed towards an improved means of transporting hydrogen gas and in an arrangement wherein the means of transportation simultaneously may function as a storage medium.

It is therefore an object of this invention to provide an improved means of transporting hydrogen.

More particularly, an object of this invention is to provide a method of transportation including a system employing the use of metallic hydrides and in an arrangement wherein the pipeline functions not only as a means of transporting hydrogen fuel but also as a means of storage of the fuel.

These general objects, as well as other and more specific objects of the invention will be fulfilled in the following description and claims, taken in conjunction with the attached drawings.

DESCRIPTION OF THE DRAWINGS

The drawing is a diagrammtic illustration of a means of employing the principles of this invention wherein hydrogen gas is transported employing a pipeline which is at least partially filled with metallic hydride material.

SUMMARY OF THE INVENTION

A method and apparatus is disclosed for transporting hydrogen gas wherein gas available at one point is conveyed to a distant point. A pipeline is provided which is at least partially filled with metallic hydride material selected of the type having a characteristic of freely absorbing hydrogen gas at a selected pressure and temperature and freely releasing hydrogen gas at another pressure and temperature wherein hydrogen migrates from the inlet to the outlet end of the pipeline as a means of transporting the hydrogen from one point to another while simultaneously the pipeline itself, because of the great amount of hydrogen which may be absorbed by metallic hydrides, functions as a storage means.

DETAILED DESCRIPTION OF THE DRAWINGS

It has long been recognized tht metallic hydrides have surprising and useful properties. Metallic hydride is a chemical compound in which one or more hydrogen atoms or ions are attached to a metal. One of the most interesting properties of metal hydrides is the almost incredible volume of hydrogen which may be attached to the metal. As an example, upon heating one cubic centimeter of titanium hydride more than 1,600 cubic centimeters of hydrogen gas, measured at 0° C., is evolved. Surprisingly, one cubic centimeter of titanium hydride contains considerably more hydrogen than does one cubic centimeter of pure solid hydrogen at its freezing point.

This invention takes advantage of the unique characteristics of metal hydrides. A method and apparatus is disclosed which may be used to augment the transportation and storage of hydrogen. As previously indicated, hydrogen is a highly useful and will become an increasingly important fuel source. However, like any energy form, it must be transported from a point of manufacture, to a point of consumption and frequently the efficiency of storage and transfer of a fuel determines its usefulness.

Hydrogen as a fuel source has a particular problem concerning its transportation and storage, even though hydrogen is an ideal fuel source in many ways. It burns without contamination, uniting with oxygen in the air and producing, as a consequence of combustion, heat plus the formation of water. The heat generated by combustion of one cubic foot of hydrogen is about 269 BTU compared to natural gas, including primarily methane, which produces approximately 885 BTU per cubic foot. Thus, to transport an equal amount of energy over three times the volume of hydrogen must be transported as of natural gas. In addition, because of the relatively low BTU output resulting from the combustion of hydrogen, hydrogen gas must be stored in great volumes in order to compare favorably with the storage requirements of other fuels.

As shown in the drawing, a source of hydrogen gas is indicated by the numeral 10. This source may be any means of mechanically, electrically or chemically producing hydrogen. The electrolysis of water is one means of producing hydrogen. The hydrogen gas is first treated at a station 12 to remove impurities. Since this invention includes the use of metallic hydrides, it is important that any deleterious amounts of impurities which might impair the efficiency and effectiveness of metallic hydrides to absorb and release hydrogen must be removed. The common impurities which must be removed at station 12 are oxygen and carbon dioxide.

After removal of any deleterious contaminates, the hydrogen gas is elevated in pressure by means of a compressor 14. The pressure selected will depend upon many factors which can be arrived at only as a consequence of economic engineering; that is, the greater the pressure of the hydrogen gas delivered by compressor 14 the greater the quantity of gas which may be transmitted in a pipeline of given diameter, but simultaneously the cost of construction of the pipeline increases. This problem is aggravated particularly in considering the construction of a pipeline for the transmission of hydrogen. Hydrogen has the characteristic of reacting with metals of the type of which pipelines are typically constructed. This phenomena is termed "hydrogen embrittlement." The embrittled metals are weakened and thereby any pipeline in which hydration of the metal forming the pipeline occurs is subject to failure. However, common steel is freely usable as a pipeline material if the pressure of the hydrogen in the pipeline is kept below a reasonable level, such as 70 kilograms per square centimeter and the temperature below 204° C. With the selection of other types of materials, greater pressures and higher temperatures may be employed; however, the advantages of the higher pressures and higher temperatures may be offset by increased pipeline construction costs. Thus, the pressure delivered by compressor 14 is, as previously stated, dependent upon engineering principles which can only be calculated in terms of the actual transportation project to which the invention is applied.

The compressed hydrogen gas is moved to the inlet 16 of a pipeline 18. "Pipeline" as used here in means a long length of conduit, normally of metal, and normally buried in the earth, extending from a first geographical point to a second, remote geographical point. A pipeline has a length at least a thousand times its diameter. Within the pipeline 18 is a metallic hydride material 20. The specific type of metallic hydride material employed will again depend upon engineering considerations. Many types of metallic hydrides are known and their characteristics have been evaluated, including, as example, lithium hydride, plutonium hydride, magnesium hydride, thorium hydride, zirconium hydride, etc. In fact, most metals form hydrides. It has been found that mixtures of metals have improved kinetic and economic factors. Such mixtures include magnesium nickel, iron titanium, lanthanum-nickel, etc. Metallic hydrides usually are in the form of crystals or metallic powder. Titanium hydride, for instance, is a metallic powder where the particles are cubic; lanthanum hydride is metallic gray powder; lithium hydride is a white cubic crystal resembling salt (NaCl); etc. The metallic hydride material 20 may be placed in the pipeline 18 so as to fill only a portion of the interior of the pipe or it may be packed in such a way as to substantially fill the entire interior area of the pipeline. When hydrogen gas is introduced under proper pressure and temperature into the inlet end 16 of pipeline 18, the metallic hydride material 20 will absorb the hydrogen gas, the rate of absorption depending upon the initial degree of freedom of the metallic material from hydrogen, its temperature, and the gas pressure. Absorption of hydrogen gas is an exothermic reaction, producing heat which is dissipated by means of the pipeline into the surrounding earth 22.

The invention may be practiced in two modes, in one mode the entire pipeline 18 is filled with metallic hydride particles 20 and substantially all of the hydrogen gas which passes through the line is the result of absorption and desorption occurring in the hydride. In this manner, the hydrogen migrates from the inlet end of 16 to the outlet end 24 of the pipeline.

A second method of the invention includes the arrangement wherein the metallic hydride material 20 fills less than the total interior volume of the pipeline 18 whereby hydrogen gas passes by way of separate but simultaneous means of movement; that is, first by the gas flowing into the inlet end 16, passing through the pipeline, and out the outlet end 24 without forming a hydride, and simultaneously, by migration of hydrogen by the particles of metallic hydrides 20 within the pipeline. In either method the pipeline serves not only as a means of transportation of hydrogen from one point to another but simultaneously as a storage reservoir. When the metallic hydride 20 has been charged up and the absorption has migrated to the outlet end, hydrogen may be withdrawn from the outlet end 24 for a prolonged period even if input of hydrogen into inlet end 16 is interrupted. This contrasts with the typical gas transmission line wherein the only storage achieved by a pipeline is due to the compressibility of gas and wherein delivery of gas at the outlet end is substantially dependent on simultaneous input of gas into the inlet end.

The amount of storage achieved by the pipeline primarily depends upon four factors: First, the volume of the line which is determined by pipeline diameter and length; second, the percentage of the interior volume of the pipeline filled with the metallic hydride; third, the temperature and pressure characteristics of the line; and fourth, the characteristics of the hydride particles. Metallic hydrides vary considerably in the degree of capability of absorbing hydrogen. The cost of metallic hydride also varies greatly. For instance, magnesium hydride may be substantially less expensive than iron titanium hydride; but on the other hand, iron titanium hydride has much better absorption and desorption characteristics than does magnesium hydride. The design of any particular pipeline employing the principles of this invention will be based upon engineering economics, and the criteria for balancing transmission efficiency versus storage capacity will depend on the particular requirements of the delivery system. In like manner, the selection of the metal hydride utilized in the pipeline will depend upon economic factors.

To retain the metal hydride 20 within the pipeline 18 and prevent it from flowing downstream into distribution facilities 26, a porous filter 28 may be connected to the outlet end 24. The function of filter 28 is to permit the free passage of hydrogen gas but to retain any metallic hydride particles which would tend to be carried by the gas stream. While various filter arrangements will fulfill the objective of element 28, an example is the use of sintered metal having interstices of dimensions sufficiently small to impede the passage of the metal hydride particles 20.

Preferably, a porous filter 30 is also placed at the inlet end 16 of the pipeline to prevent the migration of metallic hydride particles 20 back towards compressor 14 in the event of failure in the pipeline facilities which would result in higher pressure within the pipe-line compared to the input system.

It is apparent that a variety of ancillary storage apparatus may be incorporated with pipeline 18. This may take the form of underground or above ground storage tanks filled or partially filled with metallic hydrides. Underground storage caverns can be filled or partially filled with metallic hydrides to store hydrogen with connection in various ways to pipeline 18.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element or step thereof is entitled.

What is claimed is:

1. A method of transmitting hydrogen from a first geographical point to a remote second geographical point, comprising:
   purifying hydrogen gas to remove deleterious amounts of oxygen, carbon dioxide, and other contaminates;
   adjusting the temperature and pressure of the purified hydrogen gas to preselected levels;
   introducing the hydrogen gas into the inlet of a pipeline at a first geographical point, the pipeline being at least partially filled with activated metallic hydride wherein at least a portion of the hydrogen gas is absorbed by the hydride, and at least a portion of the hydrogen migrates from the inlet to the outlet of the pipeline by means of metallic hydride, the outlet of the pipeline being at a second, remote geographical location; and
   withdrawing hydrogen gas from the pipeline outlet end, at the second, remote geographical location, at least a portion of the hydrogen gas withdrawn being desorbed from the metallic hydride.

2. A method of transmitting hydrogen according to claim 1 wherein hydrogen gas is introduced into the inlet end of a pipe substantially filled with activated metallic hydride and wherein the step of withdrawing hydrogen gas from the outlet end of the pipeline includes a substantial portion of the withdrawn hydrogen gas emanating as hydrogen gas desorbed from the hydride.

3. Apparatus for transmitting hydrogen gas from a first geographical point to a remote second geographical point, comprising:
   means of compressing hydrogen gas to a preselected pressure at a first point;
   a pipeline having an inlet at the first geographical point and an outlet end at a remote second geographical point, the pipeline being at least partially filled with activated metallic hydride material;
   means of conveying hydrogen gas from said compressor to said pipeline inlet, at least a portion of the hydrogen gas being absorbed by said metallic hydride material in said pipeline, and at least a portion of the hydrogen migrating from said inlet at the first geographical point to said outlet end of said pipeline at the remote second geographical point through said metallic hydride material; and
   means of removing hydrogen gas from said pipeline outlet, at least a portion of the removed hydrogen gas emanating from desorption of said metallic hydride at said pipeline outlet.

4. Apparatus for transmitting hydrogen gas according to claim 3 including:
   filter means at said pipeline outlet end permitting hydrogen gas to pass therethrough and preventing movement of metallic hydride material from said pipeline.

* * * * *